United States Patent
Ori

(10) Patent No.: US 7,212,350 B2
(45) Date of Patent: May 1, 2007

(54) ZOOM OPTICAL SYSTEM THAT INCLUDES A FUNCTION OF PREVENTING BLURRING OF AN IMAGE

(75) Inventor: Tetsuya Ori, Koshigaya (JP)

(73) Assignee: Fujinon Corporation, Saitama (JP)

(*) Notice: Subject to any disclaimer, the term of this patent is extended or adjusted under 35 U.S.C. 154(b) by 0 days.

(21) Appl. No.: 11/365,841

(22) Filed: Mar. 2, 2006

(65) Prior Publication Data

US 2006/0215278 A1 Sep. 28, 2006

(30) Foreign Application Priority Data

Mar. 24, 2005 (JP) .............................. 2005-086925

(51) Int. Cl.
*G02B 15/14* (2006.01)
*G02B 9/34* (2006.01)

(52) U.S. Cl. ...................... 359/687; 359/684; 359/685; 359/686; 359/774

(58) Field of Classification Search ................ 359/554, 359/557, 684–687, 715, 740, 774; 396/52; 348/208.99

See application file for complete search history.

(56) References Cited

U.S. PATENT DOCUMENTS

| 6,473,231 | B2* | 10/2002 | Hamano et al. | 359/557 |
| 6,606,194 | B2* | 8/2003 | Hamano et al. | 359/557 |
| 6,995,923 | B2* | 2/2006 | Noda | 359/689 |
| 7,139,130 | B2* | 11/2006 | Yamada | 359/684 |
| 2002/0063961 | A1* | 5/2002 | Hamano et al. | 359/684 |
| 2003/0123157 | A1* | 7/2003 | Nishimura | 359/557 |
| 2006/0072213 | A1* | 4/2006 | Shibayama et al. | 359/692 |

FOREIGN PATENT DOCUMENTS

JP 08234107 A * 9/1996

* cited by examiner

*Primary Examiner*—Angela Ortiz
*Assistant Examiner*—DaWayne A. Pinkney
(74) *Attorney, Agent, or Firm*—Arnold International; Jon W. Henry; Bruce Y. Arnold

(57) ABSTRACT

A zoom optical system includes a function of preventing blurring of an image due to movements, such as shaking of the zoom optical system, by moving a lens element of the third lens group, in order from the object side, of four lens groups in a direction that is perpendicular to the optical axis in order to correct for movements of the zoom optical system that would otherwise create a blurred image. The second lens group from the object side has negative refractive power and the other three lens groups have positive refractive power. The second and fourth lens groups move along the optical axis during zooming. The zoom optical system satisfies certain conditions related to the configuration of the lens elements and lens groups of the zoom optical system in order to prevent blurring and to provide a compact zoom optical system having excellent correction of aberrations.

2 Claims, 6 Drawing Sheets

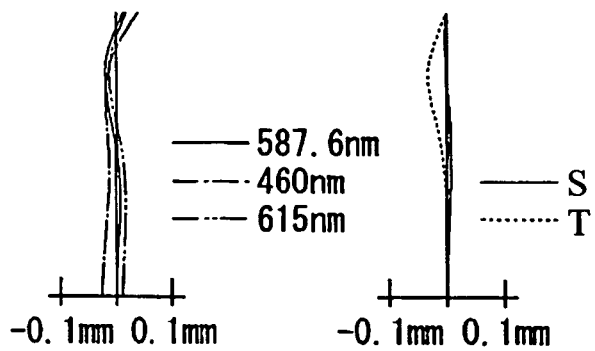
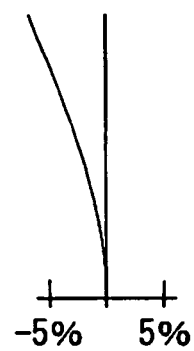
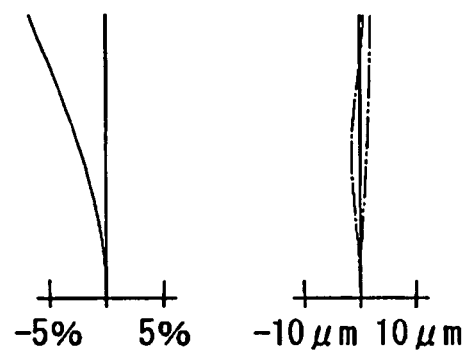
Spherical Aberration
Fig. 3A
Astigmatism
Fig. 3B
Distortion
Fig. 3C
Lateral Color
Fig. 3D
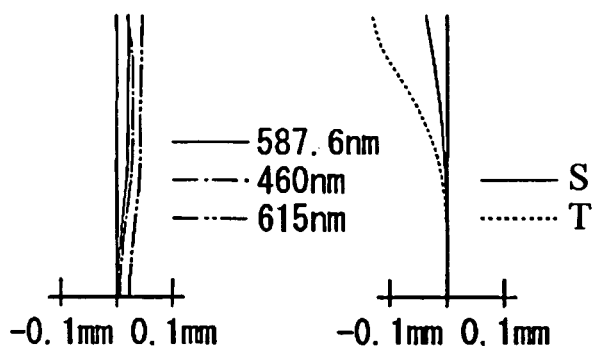
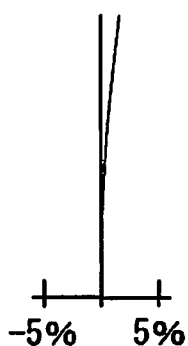
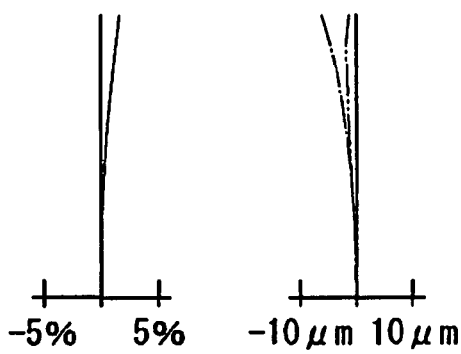
Spherical Aberration
Fig. 4A
Astigmatism
Fig. 4B
Distortion
Fig. 4C
Lateral Color
Fig. 4D

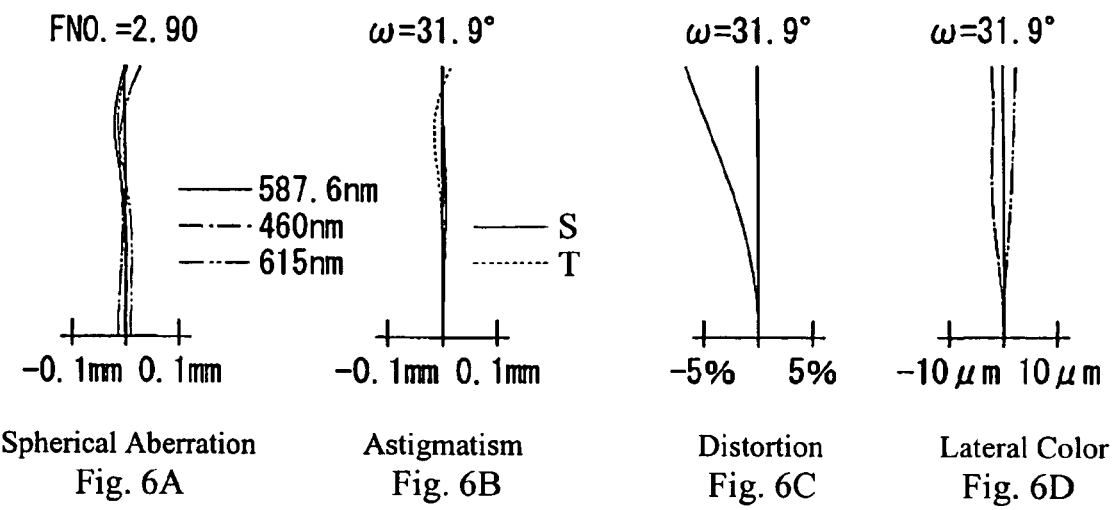
Spherical Aberration
Fig. 6A
Astigmatism
Fig. 6B
Distortion
Fig. 6C
Lateral Color
Fig. 6D
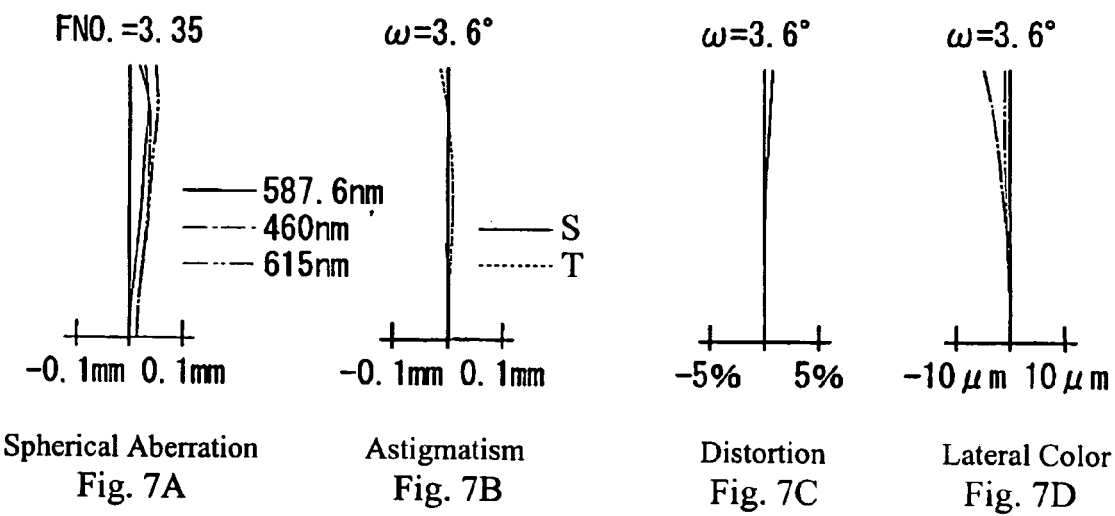
Spherical Aberration
Fig. 7A
Astigmatism
Fig. 7B
Distortion
Fig. 7C
Lateral Color
Fig. 7D

ZOOM OPTICAL SYSTEM THAT INCLUDES A FUNCTION OF PREVENTING BLURRING OF AN IMAGE

TECHNICAL FIELD OF THE INVENTION

The present invention relates to a zoom optical system for mounting in compact digital still cameras (commonly called digital cameras) and video cameras for household use that includes a function of preventing blurring of an image.

BACKGROUND OF THE INVENTION

During photography using a digital camera or a video camera for household use, recorded images are sometimes blurred due to movements, such as vibrations, of the zoom optical system during image capture that are caused by the hands of the operator of the camera shaking or by other factors. In known conventional techniques for preventing such blurring of images by optical compensation, specified lenses of the imaging optical system are moved perpendicular to the optical axis in order to provide a function of preventing blurring of an image that is photographed or otherwise picked up, as described for example in Japanese Laid-Open Patent Application Nos. H10-260355, H11-237550, and H10-260356. This function of preventing blurring of an image is also known simply as an image-blur prevention function.

Japanese Laid-Open Patent Application No. H10-260355 discloses a zoom optical system with an image-blur prevention function built into the zoom optical system. Specifically, this application describes a zoom optical system having a four-group construction that includes, arranged along the optical axis in order from the object side, a first lens group having positive refractive power, a second lens group having negative refractive power, a third lens group having positive refractive power, and a fourth lens group having positive refractive power. In this zoom optical system, the third lens group has two groups of lens elements having positive refractive power, and when movements, such as vibrations, occur that would otherwise blur a picked up image, optical compensation in order to prevent blurring is achieved by moving one of the two groups of lens elements within the third lens group perpendicular to the optical axis of the zoom optical system.

Japanese Laid-Open Patent Application No. H11-237550 also discloses a zoom optical system with an image-blur prevention function and having a four-group construction that includes, arranged along an optical axis in order from the object side, a first lens group having positive refractive power, a second lens group having negative refractive power, a third lens group having positive refractive power, and a fourth lens group having positive refractive power. In this zoom optical system, the third lens group has two groups of lens elements of negative and positive refractive power in order from the object side, and when movements, such as vibrations, occur that would otherwise blur an image, optical compensation in order to prevent blurring is achieved by moving a group of lens elements within the third lens group that is on the image side having positive refractive power in a direction that is perpendicular to the optical axis. Furthermore, it is constructed so that the following conditions are satisfied:

$$8 < f3/fw < 25$$

$$0.3 < |f32/f3| < 0.75$$

where
f3 is the focal length of the third lens group,
fw is the focal length of the zoom optical system at the wide-angle end, and
f32 is the focal length of the positive, image-side group of lens elements of the third lens group.

The above conditions are satisfied in order to obtain a back focal length that is large enough and to improve the sensitivity of the zoom optical system to movements of the positive, image-side group of lens elements of the third lens group.

Additionally, Japanese Laid-Open Patent Application No. H10-260356 discloses a zoom optical system with an image-blur prevention function and having a four-group construction that includes, arranged along an optical axis in order from the object side: a first lens group having positive refractive power, a second lens group having negative refractive power, a third lens group having positive refractive power, and a fourth lens group having positive refractive power. The third lens group includes a meniscus lens element of negative refractive power having an aspheric surface, and with its concave surface on the image side. In this zoom optical system, image blur that would normally occur in a picked up image, such as a photographed image, due to vibration of the zoom optical system is prevented by compensating movements of the third lens group in a direction perpendicular to the optical axis.

Recently, a zoom optical system has been desired that has a more compact construction overall and also has a more accurate image-blur prevention function. However, the zoom optical system of Japanese Laid-Open Patent Application No. H10-260355 discussed above provides only a small correction in the angle of view, and sometimes blurring of the image cannot be prevented. For example, the following condition is satisfied:

$$1.3 < fSL/f3 < 2.0$$

where
fSL is the focal length of the group of lens elements in the third lens group that moves for image blur prevention, and
f3 is the focal length of the entire third lens group.

However, because the refractive power of the group of lens elements in the third lens group that moves for image-blur prevention is small, this group of lens elements may have to move a large amount in order to prevent blurring of an image, and also the overall length of the zoom optical system becomes large. This tends to increase the overall size of the entire device. Also, in the zoom optical system of Japanese Laid-Open Patent Application No. H11-237550 discussed above, the following condition is satisfied:

$$8 < f3/fw < 25$$

where
f3 and fw are as defined above.

However, the refractive power of the third lens group may be small, and the amount of movement of the positive, image-side group of lens elements of the third lens group may be excessive for sufficient image-blur prevention. Moreover, because the group of lens elements of the third lens group that are on the object side of the third lens group has negative refractive power as a whole, the back focal length of the zoom optical system tends to become long. Therefore, the entire construction of the device tends to become large. Furthermore, in the zoom optical system of Japanese Laid-Open Patent Application No. H10-260356 discussed above as well, because moving the entire third lens group for image-blur prevention increases the size of the mechanism for the movement, miniaturizing the entire construction becomes difficult.

BRIEF SUMMARY OF THE INVENTION

The present invention relates to a zoom optical system that includes a sufficient function of preventing blurring of an image due to movements of the zoom optical system, such as hand shaking movements, and that exhibits excellent optical performance with a compact construction.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3D show the spherical aberration, astigmatism, distortion, and lateral color, respectively, of the zoom optical system of Embodiment 1 of the present invention at the wide-angle end;

FIGS. 4A–4D show the spherical aberration, astigmatism, distortion, and lateral color, respectively, of the zoom optical system of Embodiment 1 of the present invention at the telephoto end;

FIGS. 6A–6D show the spherical aberration, astigmatism, distortion, and lateral color, respectively, of the zoom optical system of Embodiment 2 of the present invention at the wide-angle end;

FIGS. 7A–7D show the spherical aberration, astigmatism, distortion, and lateral color, respectively, of the zoom optical system of Embodiment 2 of the present invention at the telephoto end.

DETAILED DESCRIPTION

Figure 1:
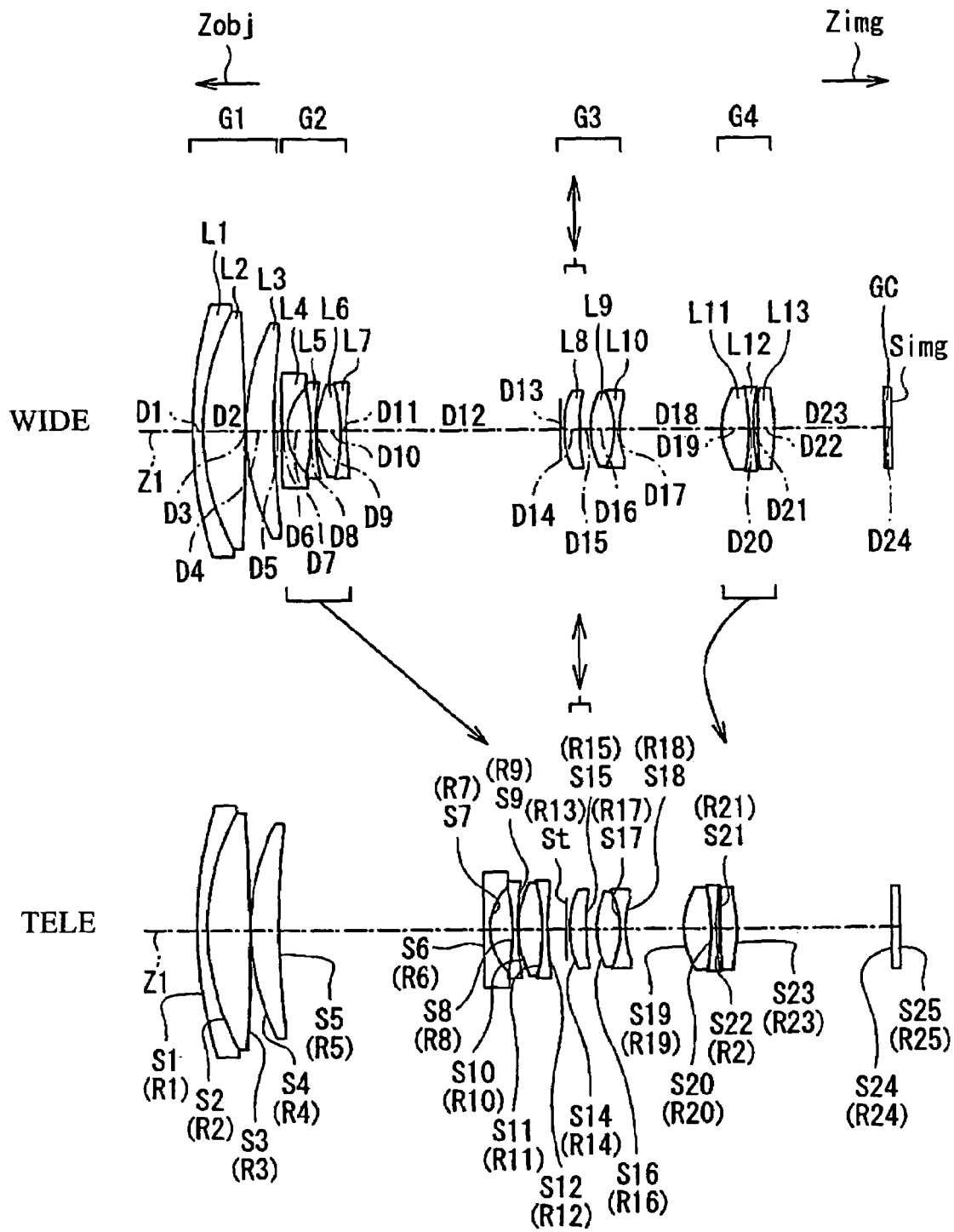
FIG. 1 shows cross-sectional views of the zoom optical system of Embodiment 1 of the present invention at the wide-angle end and at the telephoto end.

A general description of a zoom optical system that includes a function of preventing blurring of an image will first be described with reference to FIG. 1 that shows cross-sectional views of the zoom optical system of Embodiment 1 of the present invention at the wide-angle end (WIDE) with the zoom optical system focused at infinity, at the top of FIG. 1, and at the telephoto end (TELE) with the zoom optical system focused at infinity, at the bottom of FIG. 1. In FIG. 1, a horizontal arrow at the upper left labeled "Zobj" points in the direction indicating the object side of the zoom optical system, and a horizontal arrow at the upper right labeled "Zimg" points in the direction indicating the image side of the zoom optical system. At the top of FIG. 1, lens elements are referenced by the letter L followed by a number denoting their order from the object side of the zoom optical system along the optical axis Z1, from L1 to L13. Similarly, at the bottom of FIG. 1, the surfaces of the various optical elements, including the lens surfaces, are referenced by the letter S followed by a number denoting their order from the object side of the zoom optical system along the optical axis, from S1 to S25, and the corresponding radii of curvature of the surfaces of the various optical elements, including the lens surfaces, are referenced in parentheses under the S number of the surfaces by the letter R followed by a number denoting their order from the object side of the zoom optical system, from R1 to R25. Note that although R is the on-axis radius of curvature, for convenience of illustration, in FIG. 1 the lead lines from the R reference symbols extend to the surfaces being referenced but do not extend to the on-axis positions. Also, near the top of FIG. 1, the on-axis surface spacings along the optical axis Z1 of the various optical surfaces are referenced by the letter D with a number denoting their order from the object side of the zoom optical system, from D1 to D24. In the same manner, at the top of FIG. 1, four lens groups are labeled G1, G2, G3, and G4 in order from the object side of the zoom optical system and the lens elements belonging to each lens group are indicated by the brackets adjacent the labels G1, G2, G3, and G4.

Additionally, in the middle of FIG. 1, downwardly directed arrows below the two lens groups G2 and G4 indicate the movement of these two lens groups along the optical axis Z1 during zooming, with movement during zooming from the wide-angle end (WIDE) to the telephoto end (TELE) of the zoom range being indicated by the component of these arrows in the direction of the optical axis Z1. These arrows illustrate, for example, that during zooming from the wide-angle end to the telephoto end: (a) the distance along the optical axis between the first lens group G1 and the second lens group G2 increases and the distance along the optical axis Z1 between the second lens group G2 and the third lens group G3 decreases as the second lens group moves along the optical axis continuously toward the image side and the first lens group G1 and the third lens group G3 do not move in the direction of the optical axis Z1; and (b) the fourth lens group G4 also moves along the optical axis Z1. Also, in FIG. 1, a double headed vertical arrow indicates the movement of the eighth lens element L8 of the third lens group G3 in a direction orthogonal to the optical axis Z1 in order to correct for movements, due for example to hand shaking, of the zoom optical system in order to prevent such movements causing a blurred image to be formed at an image plane Simg on the image side of the zoom optical system. Additionally, FIG. 1 shows a parallel plane plate cover glass GC adjacent the image plane Simg and a diaphragm or stop, labeled St at the bottom of FIG. 1, on the object side of the fourteenth optical surface S14.

Figure 2:
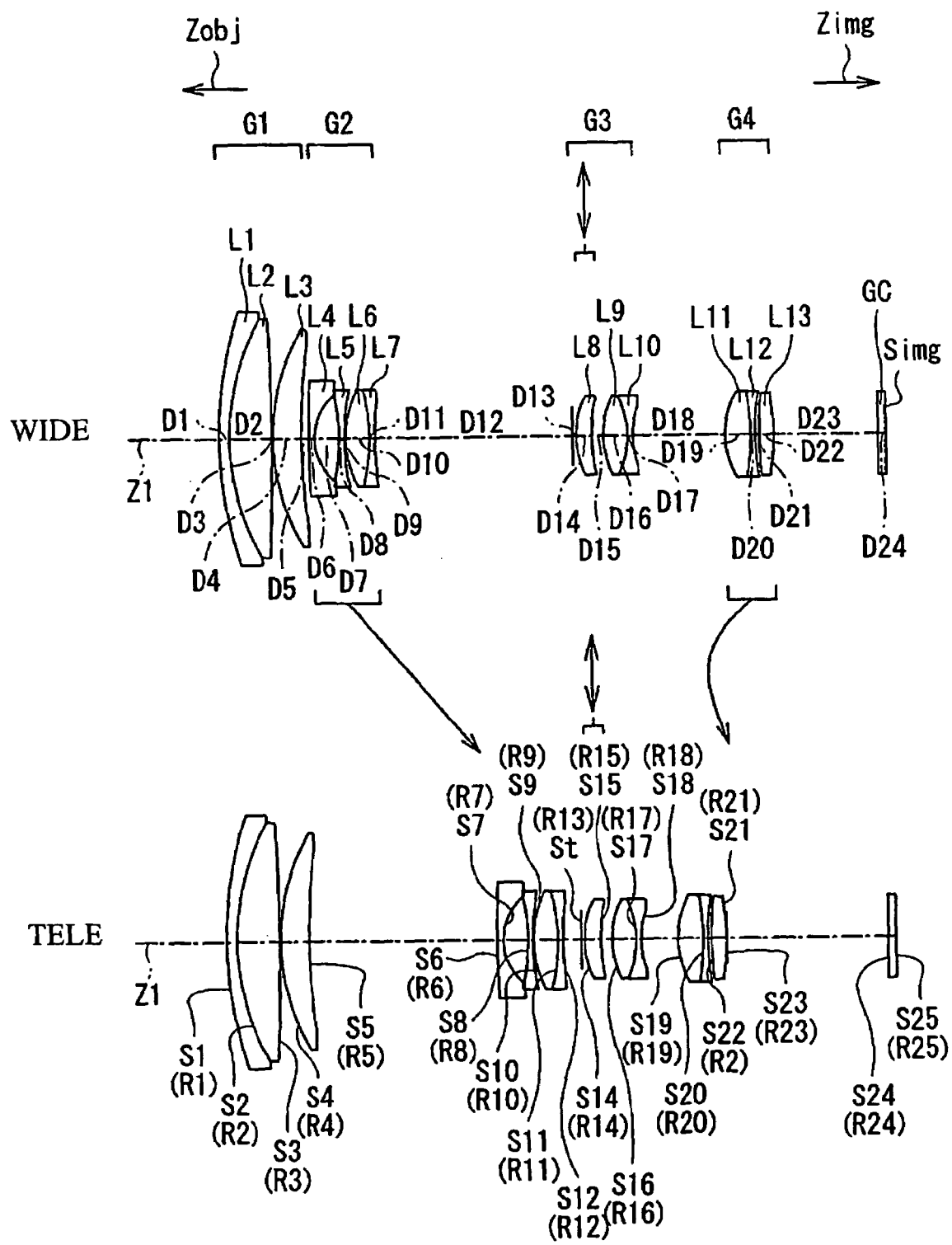
FIG. 2 shows cross-sectional views of the zoom optical system of Embodiment 2 of the present invention at the wide-angle end and at the telephoto end.

FIG. 2 similarly shows cross-sectional views of the zoom optical system of Embodiment 2 of the present invention at the wide-angle end (WIDE) and at the telephoto end (TELE) with the zoom optical system focused at infinity. The general configurations of the zoom optical system of Embodiments 1 and 2 are similar and therefore these embodiments are generally described with reference to FIG. 1 that shows Embodiment 1. However, features of Embodiment 2 that differ from Embodiment 1 will be pointed out with reference to FIG. 2 in the separate description of Embodiment 2.

The terms "lens group", "lens element", and "lens component" will now be defined, with the term "lens group" being defined in terms of "lens elements" and "lens components" as explained herein. The term "lens element" is herein defined as a single transparent mass of refractive material having two opposed refracting surfaces, which surfaces are positioned at least generally transversely of the optical axis of the zoom optical system. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, two or more lens elements may be joined together, as by cementing the lens elements together, in order to form a lens component.

The term "lens group" is herein defined as an assembly of one or more lens components in optical series and with no intervening lens components along an optical axis that, during zooming, is movable as a single unit relative to another lens component or other lens components. It is noted that this definition of "lens group" differs from how the term may be used to describe optical systems, including some descriptions of the zoom optical systems of the Japanese applications discussed in the Background of the Invention above. In particular, the term "lens group" is often used to describe adjacent groups of lens elements that do not move relative to one another along an optical axis.

The zoom optical system of the present invention may be mounted, for example, in compact cameras, digital still cameras and video cameras for household use. As shown in FIG. 1, this zoom optical system includes, arranged along the optical axis Z1 from the object side, the first lens group G1 having positive refractive power, the second lens group G2 having negative refractive power, the third lens group G3 having positive refractive power, and the fourth lens group G4 having positive refractive power, and the parallel plane plate cover glass GC. The image pickup surface of an image pickup device such as a CCD (charge-coupled device) is provided on the imaging surface Simg. FIG. 1 shows the diaphragm St in an exemplary position on the object side of the third lens group G3. As shown in FIG. 1, the distances along the optical axis between the first and second lens groups G1 and G2 and between the second and third lens groups G2 and G3 change during zooming from the wide-angle end to the telephoto end. As shown by the downwardly directed arrows in FIG. 1, during zooming from the wide-angle end to the telephoto end while the zoom optical system is focused at infinity, the distance along the optical axis Z1 between the first lens group G1 and the second lens group G2 increases, the second lens group moves along the optical axis Z1 continuously toward the image side, the first and third lens groups, G1 and G3, do not move along the optical axis Z1, and the fourth lens group G4 moves along the optical axis as indicated by a downwardly directed curved arrow. However, the actual movement being indicated by these arrows is only straight line movement along the optical axis Z1, unlike the movement indicated by the double-headed vertical arrow above lens group G3 in FIG. 1. The arrows related to zooming indicate that as the second lens group G2 moves along the optical axis continuously toward the image side at a constant speed, the fourth lens group G4 moves more quickly along the optical axis as zooming approaches the wide-angle end and as zooming approaches the telephoto end than in the middle range of zooming between the wide-angle end and the telephoto end and the direction of movement along the optical axis Z1 reverses from moving toward the object side to moving toward the image side. The fourth lens group G4 also has a function of moving along the optical axis Z1 during focusing.

The first lens group G1 does not move along the optical axis Z1 during either zooming or focusing. In the example of Embodiment 1, the first lens group G1 has a three lens element configuration formed of, in order from the object side, a first lens element L1 having a meniscus shape, having negative refractive power, and having a convex surface on the object side, a second biconvex lens element L2 that is joined to lens element L1 to form a lens component, and a third lens element L3 having a meniscus shape, having positive refractive power, and having a convex surface on the object side.

In the example of Embodiment 1, the second lens group G2 has a four lens element configuration formed of, in order from the object side, a fourth lens element L4 having a meniscus shape, having negative refractive power, and having a convex surface on the object side, a biconcave fifth lens element L5, a biconvex sixth lens element L6, and a biconcave seventh lens element L7 that is joined to lens element L6 to form a lens component.

Additionally, the zoom optical system of the present invention satisfies the following Condition (1) particularly related to the second lens group G2:

$$0.36 < |f2/(fw \cdot ft)^{0.5}| < 0.45 \qquad \text{Condition (1)}$$

where f2 is the focal length of the second lens group G2, fw is the focal length of the entire zoom optical system at the wide-angle end, and ft is the focal length of the entire zoom optical system at the telephoto end.

Condition (1) above determines the focal length f2 of the second lens group G2 so that the overall length of the zoom optical system can be reduced. At the same time, the optical properties over the entire zoom range can be improved. If the lower limit of Condition (1) is not satisfied, the refractive power of the second lens group G2 becomes too strong, degrading the optical performance with zooming. In addition, if the lower limit of Condition (1) is not satisfied, deviation of the second lens group G2 from its centered position affects the optical performance of the zoom optical system more, thus requiring extremely high accuracy in manufacturing, which is disadvantageous. On the other hand, if the upper limit Condition (1) is not satisfied, the overall length of the zoom optical system becomes relatively large.

The third lens group G3, which does not move during zooming or focusing, is formed of, in order from the object side, lens elements L8, L9, and L10. Lens element L8, in the specific example of image-blur prevention of Embodiment 1 of the present invention, performs the function of preventing blurring of an image photographed or otherwise picked up at an image plane that would otherwise result from movements of the zoom optical system, such as vibrations, by moving perpendicular to the optical axis Z1. As shown in FIG. 1, lens element L8 has a meniscus shape, has positive refractive power, has a convex surface on the object side, and has an aspheric lens surface on each side, lens surfaces S14 and S15 as shown in FIG. 1. The lens surfaces S14 and S15 that are aspheric are defined using the following Equation (A):

$$Z=[(C \cdot Y^2)/\{1+(1-K \cdot C^2 \cdot Y^2)^{1/2}\}]+\Sigma(A_i \cdot Y^i) \qquad \text{Equation (A)}$$

where

Z is the length (in mm) of a line drawn from a point on the aspheric lens surface at a distance Y from the optical axis to the tangential plane of the aspheric lens surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

The aspheric surfaces S14 and S15 are defined by at least one even order non-zero aspheric coefficient $A_i$ and at least one odd order non-zero aspheric coefficient $A_i$ in Equation (A) above.

In the example of Embodiment 1 of the present invention, as shown in FIG. 1, the third lens group G3 is formed of, in order from the object side, image-blur prevention lens element L8 having positive refractive power and having at least one aspheric surface, a biconvex ninth lens element L9, and a biconcave tenth lens element L10 that is joined to lens element L9 to form a lens component. In this zoom optical system, by having lens element L8 having positive refractive power on the object side of the third lens group G3 and biconcave lens element L10 on the image side of the third lens group G3, the overall length of the zoom optical system is reduced. Additionally, by joining lens elements L9 and L10 together, deviations of centering of these lens elements is suppressed and chromatic aberration is reduced. Additionally, because it is constructed so that blurring of an image is prevented by moving only one lens element L8, simplification of the entire construction is achieved. For example, when this zoom optical system is installed in an imaging device such as a video camera, the load on the drive mechanism for moving the image-blur prevention lens element (L8) is reduced, while at the same time simplifying the construction of the drive mechanism.

Additionally, the zoom optical system of the present invention satisfies the following Condition (2) particularly related to the third lens group G3:

$$4.3 < f3/fw < 7.0 \qquad \text{Condition (2)}$$

where fw is the focal length of the entire zoom optical system at the wide-angle end, and f3 is the focal length of the third lens group G3.

Condition (2) above determines the focal length f3 of the third lens group G3 so that the overall length of the zoom optical system can be reduced. At the same time, the optical properties over the entire zoom range can be improved. If the lower limit of Condition (2) is not satisfied, the refractive power of the third lens group G3 becomes too strong, degrading the optical performance with zooming. In addition, if the lower limit of Condition (2) is not satisfied, deviation of the third lens group G3 from its centered position affects the optical performance of the zoom optical system more, thus requiring extremely high accuracy in manufacturing, which is disadvantageous. On the other hand, if the upper limit of Condition (2) is not satisfied, the overall length of the zoom optical system becomes relatively large.

The fourth lens group G4 has a three lens element configuration formed of, in order from the object side in the example of Embodiment 1, a biconvex eleventh lens element L111, a biconcave twelfth lens element L12, and a thirteenth lens element L13 that is biconvex on the optical axis Z1 and has aspheric lens surfaces on both sides (the surfaces S22 and S23, for example) that are expressed by Equation (A) above.

Additionally, the zoom optical system of the present invention satisfies the following Condition (3):

$$2.0 < bfw/fw < 2.9 \qquad \text{Condition (3)}$$

where fw is the focal length of the entire zoom optical system at the wide-angle end, and bfw is the back focal length of the entire zoom optical system.

Condition (3) above determines the back focal length bfw of the entire zoom optical system at the wide-angle end so as to reduce the overall length of the zoom optical system while making the light beam exiting the fourth lens group G4 toward the image plane Simg more nearly a collimated light beam. If the lower limit of Condition (3) is not satisfied, the angle that light rays from the fourth lens group G4 make at the image plane Simg becomes large, reducing the amount of light at peripheral angles of view. On the other hand, if the upper limit of Condition (3) is not satisfied, the back focal length increases, resulting in an increase in the overall length of the zoom optical system.

Also, it is desirable that the zoom optical system of the present invention be constructed so as to satisfy the following Condition (4) for the correction in the angle of view $\Delta\theta$ being set at 0.5 degrees:

$$0.4 < |(1-\beta TSL) \cdot \beta tr| < 1.0 \qquad \text{Condition (4)}$$

where $\beta tSL$ is the image magnification at the telephoto end of the lens element having positive refractive power that performs the function of preventing blurring of an image (L8), and $\beta tr$ is the image magnification at the telephoto end of the entire portion of the entire zoom optical system that is on the image side of the lens element having positive refractive power that performs the function of preventing blurring of an image (L8).

Condition (4) determines the maximum displacement M of the image-blur prevention lens element L8 of the third lens group G3 perpendicular to the optical axis at the telephoto end in terms of the corresponding image displacement $\Delta Y$ on the image plane Simg according to the following Equation (B):

$$|(1-\beta tSL) \cdot \beta tr| \cdot M = \Delta Y \qquad \text{Equation (B).}$$

The image displacement $\Delta Y$ can be expressed in terms of the focal length ft of the entire zoom optical system at the telephoto end and the correction in the angle of view $\Delta\theta$ at the telephoto end according to the following Equation (C):

$$\Delta Y = ft \cdot \tan \Delta\theta \qquad \text{Equation (C).}$$

Therefore, from Equations (B) and (C) above, $$|(1-\beta tSL) \cdot \beta tr| = (ft \cdot \tan \Delta\theta)/M$$

or, by rearranging:

$$M = (ft \cdot \tan \Delta\theta)/|(1-\beta tSL) \cdot \beta tr| \qquad \text{Equation (D).}$$

In general, it is required that the correction in the angle of view Δθ be 0.5 degrees or larger. By constructing the zoom optical system to satisfy Condition (4), the maximum displacement M can be optimized, with good image-blur prevention. If the lower limit of Condition (4) is not satisfied, the sensitivity of image-blur prevention becomes too great, complicating the adjustment of the displacement of the lens element L8 in the third lens group G3. In the zoom optical system with an image-blur prevention function of the present invention, a good balance between the sensitivity of image-blur prevention and the amount of movement of the image-blur prevention lens is optimized by satisfying Condition (4) above.

Because the lens surfaces S14 and S15 of the lens element L8 and the lens surfaces S22 and S23 of the lens element L13 have shapes defined by Equation (A) above, better aberration correction is accomplished by using at least one even order non-zero aspheric coefficient $A_i$ and at least one odd order non-zero aspheric coefficient $A_i$ in Equation (A) above.

According to the zoom optical system of the present invention, good aberration correction can be made while achieving miniaturization, and at the same time, good image-blur prevention can be accomplished by optimizing the maximum displacement M of the lens element L8 as an image-blur prevention lens element.

Embodiments 1 and 2 of the present invention will now be individually described with further reference to the drawings.

Embodiment 1

FIG. 1 shows cross-sectional views of the zoom optical system of Embodiment 1 of the present invention at the wide-angle end (WIDE) and at the telephoto end (TELE) with the zoom optical system focused at infinity.

Table 1 below lists the lens group designation G (or cover glass GC) and the surface number S, in order from the object side, the radius of curvature R (in mm) of each surface on the optical axis, the on-axis surface spacing D (in mm), except that the on-axis surface spacings that vary with zooming are listed in Table 3 below, as well as the refractive index $N_d$ and the Abbe number $v_d$ at the d-line (587.6 nm) of each optical element for Embodiment 1. Note that although R is the on-axis radius of curvature, for convenience of illustration, in FIG. 1 the lead lines from the R reference symbols extend to the surfaces being referenced but do not extend to the on-axis positions.

TABLE 1

| G | S | R | D | $N_d$ | $v_d$ |
|---|---|---|---|---|---|
| 1 | 1 | 59.4370 | 1.35 | 1.84666 | 23.8 |
| 1 | 2 | 33.4699 | 5.71 | 1.49700 | 81.6 |
| 1 | 3 | −257.0056 | 0.10 | | |
| 1 | 4 | 32.0181 | 3.77 | 1.75500 | 52.3 |
| 1 | 5 | 111.1931 | D5 (variable) | | |
| 2 | 6 | 389.0082 | 0.80 | 1.88300 | 40.8 |
| 2 | 7 | 7.7918 | 3.12 | | |
| 2 | 8 | −26.6903 | 0.70 | 1.77250 | 49.6 |
| 2 | 9 | 41.2357 | 0.10 | | |
| 2 | 10 | 14.3036 | 3.16 | 1.84666 | 23.8 |
| 2 | 11 | −26.3762 | 0.71 | 1.83481 | 42.7 |
| 2 | 12 | 40.2923 | D12 (variable) | | |
| | 13 | ∞ (stop) | 0.50 | | |
| 3 | 14* | 16.3430 | 2.17 | 1.51530 | 62.8 |
| 3 | 15* | 62.3125 | 1.50 | | |
| 3 | 16 | 12.0385 | 3.14 | 1.75500 | 52.3 |
| 3 | 17 | −12.0385 | 0.70 | 1.79952 | 42.2 |
| 3 | 18 | 12.1035 | D18 (variable) | | |
| 4 | 19 | 10.9247 | 3.57 | 1.51823 | 59.0 |
| 4 | 20 | −31.6006 | 0.65 | 1.75520 | 27.5 |
| 4 | 21 | 34.5827 | 0.51 | | |
| 4 | 22* | 96.5906 | 2.19 | 1.51007 | 56.2 |
| 4 | 23* | −19.2940 | D23 (variable) | | |
| GC | 24 | ∞ | 1.05 | 1.51680 | 64.2 |
| GC | 25 | ∞ | 0.00 | | |

The lens surfaces with a * to the right of the surface number in Table 1 are aspheric lens surfaces, and the aspheric lens surface shape of these lens surfaces is expressed by Equation (A) above. In the zoom optical system of Embodiment 1, the lens surfaces S14 and S15 of the eighth lens element L8 in the third lens group G3 and the lens surfaces S22 and S23 of the thirteenth lens element L13 in the fourth lens group G4 are aspheric.

Table 2 below lists the values of the constant K and the aspheric coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E−2" represents the number $1.0 \times 10^{-2}$.

TABLE 2

| S | K | $A_3$ | $A_4$ | $A_5$ | $A_6$ |
|---|---|---|---|---|---|
| 14 | 1.3511421 | −1.9846151E−5 | 3.1211137E−4 | −3.7212807E−5 | 1.3031578E−5 |
| 15 | 7.1436977 | −6.4453147E−5 | 4.2402141E−4 | −4.7927633E−5 | 1.2058762E−5 |
| 22 | −2.3144754 | −1.3008569E−3 | 8.0282914E−4 | −2.2797613E−4 | 2.3253578E−5 |
| 23 | −3.7074101 | −1.2666889E−3 | 8.2129198E−4 | −1.6616178E−4 | 7.2676170E−6 |

| S | $A_7$ | $A_8$ | $A_9$ | $A_{10}$ |
|---|---|---|---|---|
| 14 | −1.0805420E−6 | −2.5950939E−8 | 6.7406961E−8 | −7.7112692E−9 |
| 15 | −3.5296120E−7 | 2.3964403E−8 | 5.2121324E−8 | −6.5671464E−9 |
| 22 | 1.6938803E−6 | −1.3769199E−7 | 2.5360736E−8 | −5.0157963E−9 |
| 23 | 2.7397065E−6 | 5.6880113E−8 | 1.5091666E−8 | −6.3126656E−9 |

As shown in Table 2 above, the aspheric lens surfaces of the zoom optical system of Embodiment 1 are defined effectively using non-zero aspheric coefficients $A_i$ of not only even order terms but also odd order terms.

In the zoom optical system of Embodiment 1 both the second lens group G2 and the fourth lens group G4 move during zooming. Therefore, the on-axis spacings D5, D12, D18, and D23 change with zooming. With zooming, the focal length f, the f-number $F_{NO}$, and the field angle, that is, the angle of view, 2ω, of the zoom optical system also change. Table 3 below lists the values of the focal length f (in mm), the f-number $F_{NO}$, the field angle 2ω (in degrees), and the variables D5, D12, D18, and D23 (in mm) at the wide-angle end (f=6.29 mm) and at the telephoto end (f=69.76 mm) when the zoom optical system is focused at infinity.

TABLE 3

| f | $F_{NO}$ | 2ω | D5 | D12 | D18 | D23 |
|---|---|---|---|---|---|---|
| 6.29 | 2.90 | 63.0 | 1.00 | 28.76 | 13.91 | 14.87 |
| 69.76 | 3.12 | 5.8 | 27.32 | 2.44 | 8.06 | 20.71 |

As set forth in Table 4 below, the zoom optical system of Embodiment 1 of the present invention satisfies all of Conditions (1) through (4) above. Additionally, Table 4 lists the ratio fSL/f3 of the focal length fSL of the lens element L8 in the third lens group G3 that moves for image-blur prevention and the focal length f3 of the entire third lens group G3 and also lists the maximum displacement M corresponding to the correction of the angle of view of 0.5 degrees.

TABLE 4

| Condition No. | Condition | Value |
|---|---|---|
| (1) | $0.36 < |f2/(fw \cdot ft)^{0.5}| < 0.45$ | −0.38 |
| (2) | $4.3 < f3/fw < 7.0$ | 5.42 |
| (3) | $2.0 < bfw/fw < 2.9$ | 2.47 |
| (4) | $0.4 < |(1 - \beta tSL) \cdot \beta tr| < 1.0$ | 0.60 |
| | M (angle of view correction 0.5°) | 1.01 |
| | fSL/f3 | 1.24 |

FIGS. 3A–3D show the spherical aberration, astigmatism, distortion, and lateral color, respectively, of the zoom optical system of Embodiment 1 at the wide-angle end, and FIGS. 4A–4D show the spherical aberration, astigmatism, distortion, and lateral color, respectively, of the zoom optical system of Embodiment 1 at the telephoto end. These are aberrations obtained when lens element L8 for preventing a blurred image is at its normal position and under no influence of movement of the zoom optical system, such as movement or vibration due to shaky hands holding the zoom optical system. In FIGS. 3A and 4A, the spherical aberration (in mm) is shown for the wavelengths 587.6 nm (the d-line and indicated by a solid line), 460 nm (indicated by a dashed line), and 615 nm (indicated by a double dashed line), and the f-number (FNO.) is shown. In the remaining figures, ω is the half-field angle. In FIGS. 3B and 4B, the astigmatism (in mm) is shown for both the sagittal image surface S and the tangential image surface T and is measured at 587.6 nm (the d-line). In FIGS. 3C and 4C, distortion (in percent) is measured at 587.6 nm (the d-line). In FIGS. 3D and 4D, the lateral color (in μm) is shown for wavelengths 460 nm and 615 nm relative to 587.6 nm (the d-line).

Figure 5:
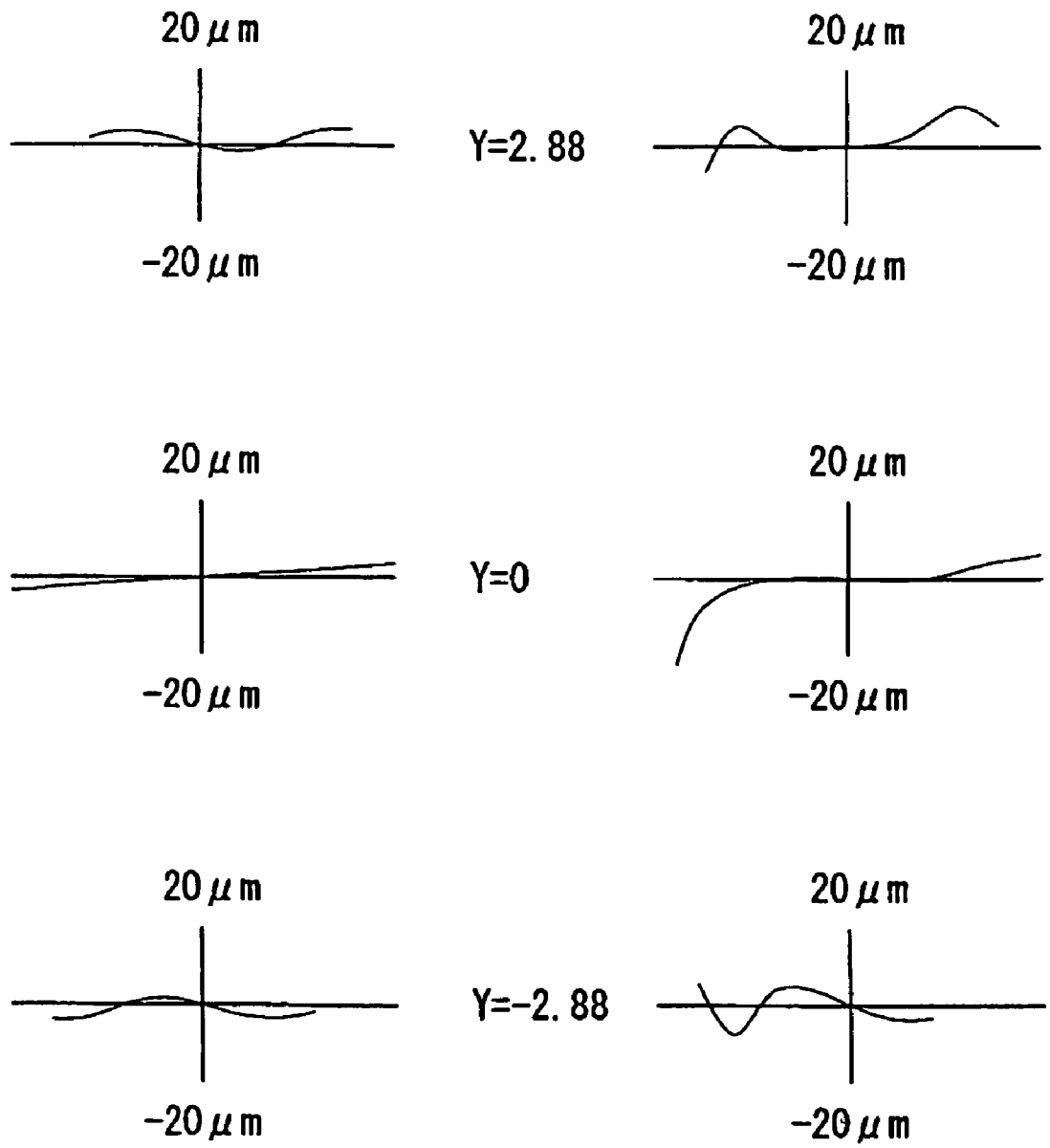
FIG. 5 shows the transverse aberrations of the zoom optical system of Embodiment 1 of the present invention at the telephoto end under normal conditions and under conditions of preventing blurring.

FIG. 5 shows coma aberrations (in μm) of the zoom optical system of Embodiment 1 of the present invention at the telephoto end under normal conditions, on the left side of FIG. 5, and under conditions of preventing blurring, on the right side of FIG. 5. Specifically, the right side of FIG. 5 shows coma aberrations during corrective movement of the eighth lens element L8 of the third lens group G3 in order to prevent a blurred image, with a correction in the angle of view of 0.5 degrees at the telephoto end. Each graph of FIG. 5 shows coma aberrations at a wavelength of 587.6 nm (the d-line), with the Y denoting the distance from the optical axis to the image point, that is, the image height (in mm).

As is evident from FIG. 5, the changes in aberrations during the movement correction for preventing blurring of an image are very small in Embodiment 1.

Additionally, as seen from the numerical data above and the figures discussed above, Embodiment 1 provides a high performance zoom optical system that can maintain excellent optical performance during the correction for preventing blurring of an image while providing a compact zoom optical system.

Embodiment 2

FIG. 2 shows cross-sectional views of the zoom optical system of Embodiment 2 of the present invention at the wide-angle end (WIDE) and at the telephoto end (TELE) with the zoom optical system focused at infinity.

Table 5 below lists the lens group designation G (or cover glass GC) and the surface number S, in order from the object side, the radius of curvature R (in mm) of each surface on the optical axis, the on-axis surface spacing D (in mm), except that the on-axis surface spacings that vary with zooming are listed in Table 7 below, as well as the refractive index $N_d$ and the Abbe number $v_d$ at the d-line (587.6 nm) of each optical element for Embodiment 2. Note that although R is the on-axis radius of curvature, for convenience of illustration, in FIG. 2 the lead lines from the R reference symbols extend to the surfaces being referenced but do not extend to the on-axis positions.

TABLE 5

| G | S | R | D | $N_d$ | $v_d$ |
|---|---|---|---|---|---|
| 1 | 1 | 54.7755 | 1.35 | 1.84666 | 23.8 |
| 1 | 2 | 32.2031 | 5.81 | 1.49700 | 81.6 |
| 1 | 3 | −306.5862 | 0.10 | | |
| 1 | 4 | 29.1163 | 3.77 | 1.72916 | 54.7 |
| 1 | 5 | 90.0019 | D5 (variable) | | |
| 2 | 6 | 153.7048 | 0.80 | 1.88300 | 40.8 |
| 2 | 7 | 7.5107 | 3.25 | | |
| 2 | 8 | −26.5480 | 0.70 | 1.77250 | 49.6 |
| 2 | 9 | 34.3675 | 0.10 | | |
| 2 | 10 | 14.1445 | 3.19 | 1.84666 | 23.8 |
| 2 | 11 | −25.8399 | 0.71 | 1.83481 | 42.7 |
| 2 | 12 | 45.7878 | D12 (variable) | | |
| | 13 | ∞ | 0.50 | | |
| | | (stop) | | | |
| 3 | 14* | 15.2428 | 2.21 | 1.51530 | 62.8 |
| 3 | 15* | 57.9088 | 1.50 | | |
| 3 | 16 | 12.1419 | 3.21 | 1.80400 | 46.6 |
| 3 | 17 | −12.1419 | 0.70 | 1.83400 | 37.2 |
| 3 | 18 | 11.5068 | D18 (variable) | | |
| 4 | 19 | 11.5422 | 3.45 | 1.56883 | 56.3 |
| 4 | 20 | −32.3664 | 0.65 | 1.78470 | 26.3 |
| 4 | 21 | 40.5963 | 0.50 | | |
| 4 | 22* | 92.0237 | 1.93 | 1.51007 | 56.2 |
| 4 | 23* | −19.9190 | D23 (variable) | | |
| GC | 24 | ∞ | 1.05 | 1.51680 | 64.2 |
| GC | 25 | ∞ | 0.00 | | |

The lens surfaces with a * to the right of the surface number in Table 5 are aspheric lens surfaces, and the aspheric lens surface shape of these lens surfaces is expressed by Equation (A) above. In the zoom optical system of Embodiment 2, the lens surfaces S14 and S15 of the eighth lens element L8 in the third lens group G3 and the lens surfaces S22 and S23 of the thirteenth lens element L13 in the fourth lens group G4 are aspheric.

Table 6 below lists the values of the constant K and the aspheric coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E–2" represents the number $1.0 \times 10^{-2}$.

TABLE 6

| S | K | $A_3$ | $A_4$ | $A_5$ | $A_6$ |
|---|---|---|---|---|---|
| 14 | 1.3510673 | −8.8701177E-6 | 3.1326732E-4 | −3.7925729E-5 | 1.2937879E-5 |
| 15 | 7.1437260 | −4.6061855E-5 | 4.3453896E-4 | −4.6875049E-5 | 1.2039678E-5 |
| 22 | −2.3144765 | −1.2716637E-3 | 7.8619537E-4 | −2.2806905E-4 | 2.3384696E-5 |
| 23 | −3.7067863 | −1.2376252E-3 | 8.0906825E-4 | −1.6617877E-4 | 7.3501000E-6 |

| S | $A_7$ | $A_8$ | $A_9$ | $A_{10}$ |
|---|---|---|---|---|
| 14 | −1.0739938E-6 | −2.7190366E-8 | 6.7324773E-8 | −7.4929618E-9 |
| 15 | −3.5278066E-7 | 2.8684453E-8 | 5.3676868E-8 | −6.7785553E-9 |
| 22 | 1.7279418E-6 | −1.3422455E-7 | 2.5039382E-8 | −4.7434251E-9 |
| 23 | 2.7452836E-6 | 6.5486030E-8 | 1.6955641E-8 | −6.5798941E-9 |

As shown in Table 6 above, the aspheric lens surfaces of the zoom optical system of Embodiment 2 are defined effectively using non-zero aspheric coefficients $A_i$ of not only even order terms but also odd order terms.

In the zoom optical system of Embodiment 2 both the second lens group G2 and the fourth lens group G4 move during zooming. Therefore, the on-axis spacings D5, D12, D18, and D23 change with zooming. With zooming, the focal length f, the f-number $F_{NO}$, and the field angle, that is, the angle of view, 2ω, of the zoom optical system also change. Table 7 below lists the values of the focal length f (in mm), the f-number $F_{NO}$, the field angle 2ω (in degrees), and the variables D5, D12, D18, and D23 (in mm) at the wide-angle end (f=6.23 mm) and at the telephoto end (f=57.65 mm) when the zoom optical system is focused at infinity.

TABLE 7

| f | $F_{NO}$ | 2ω | D5 | D12 | D18 | D23 |
|---|---|---|---|---|---|---|
| 6.23 | 2.90 | 63.8 | 1.00 | 26.30 | 12.58 | 13.66 |
| 57.65 | 3.35 | 7.2 | 24.82 | 2.48 | 6.19 | 20.05 |

As set forth in Table 8 below, the zoom optical system of Embodiment 2 of the present invention satisfies all of Conditions (1) through (4) above. Additionally, Table 8 lists the ratio fSL/f3 of the focal length fSL of the lens element L8 in the third lens group G3 that moves for image-blur prevention and the focal length f3 of the entire third lens group G3 and also lists the maximum displacement M corresponding to the correction of the angle of view of 0.5 degrees.

TABLE 8

| Condition No. | Condition | Value |
|---|---|---|
| (1) | $0.36 < |f2/(fw \cdot ft)^{0.5}| < 0.45$ | −0.42 |
| (2) | $4.3 < f3/fw < 7.0$ | 5.15 |
| (3) | $2.0 < bfw/fw < 2.9$ | 2.30 |
| (4) | $0.4 < |(1 - \beta tSL) \cdot \beta tr)| < 1.0$ | 0.62 |
| | M (angle of view correction 0.5°) | 0.81 |
| | fSL/f3 | 1.23 |

FIGS. 6A–6D show the spherical aberration, astigmatism, distortion, and lateral color, respectively, of the zoom optical system of Embodiment 2 at the wide-angle end, and FIGS. 7A–7D show the spherical aberration, astigmatism, distortion, and lateral color, respectively, of the zoom optical system of Embodiment 2 at the telephoto end. These are aberrations obtained when lens element L8 for preventing a blurred image is at its normal position and under no influence of movement of the zoom optical system, such as movement or vibration due to shaky hands holding the zoom optical system. In FIGS. 6A and 7A, the spherical aberration (in mm) is shown for the wavelengths 587.6 nm (the d-line and indicated by a solid line), 460 nm (indicated by a dashed line), and 615 nm (indicated by a double dashed line), and the f-number (FNO.) is shown. In the remaining figures, ω is the half-field angle. In FIGS. 6B and 7B, the astigmatism (in mm) is shown for both the sagittal image surface S and the tangential image surface T and is measured at 587.6 nm (the d-line). In FIGS. 6C and 7C, distortion (in percent) is measured at 587.6 nm (the d-line). In FIGS. 6D and 7D, the lateral color (in μm) is shown for wavelengths 460 nm and 615 nm relative to 587.6 nm (the d-line).

Figure 8:
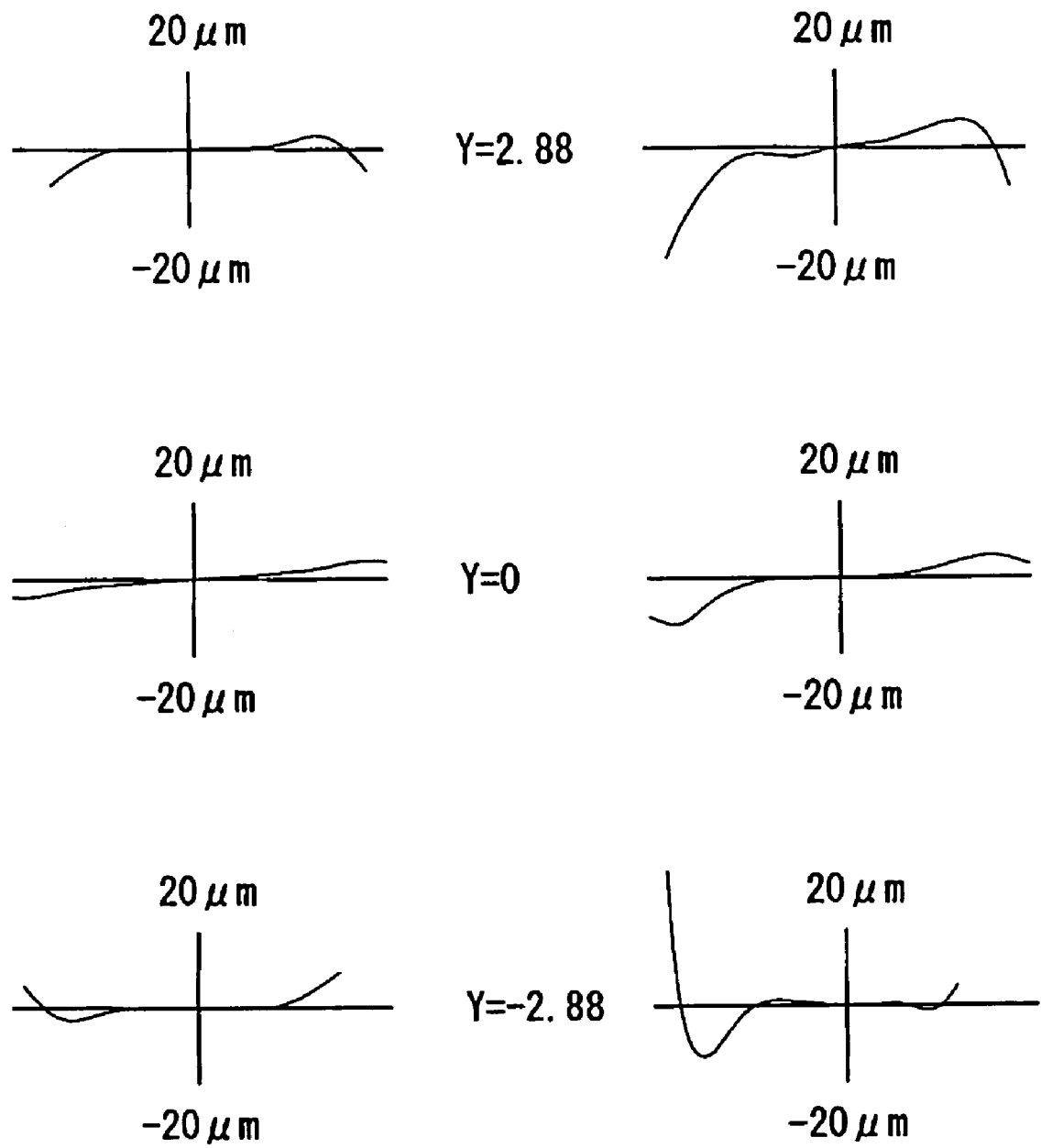
FIG. 8 shows the transverse aberrations of the zoom optical system of Embodiment 2 of the present invention at the telephoto end under normal conditions and under conditions of preventing blurring.

FIG. 8 shows coma aberrations (in μm) of the zoom optical system of Embodiment 2 of the present invention at the telephoto end under normal conditions on the left side of FIG. 8, and under conditions of preventing blurring on the right side of FIG. 8. Specifically, the right side of FIG. 8 shows coma aberrations during corrective movement of the eighth lens element L8 of the third lens group G3 in order to prevent a blurred image, with a correction in the angle of view of 0.5 degrees at the telephoto end. Each graph of FIG. 8 shows coma aberrations at a wavelength of 587.6 nm (the d-line), with the Y denoting the distance from the optical axis to the image point, that is, the image height (in mm).

As is evident from FIG. 8, the changes in aberrations during the correction for preventing blurring of an image are very small in Embodiment 2.

Additionally, as seen from the numerical data above and the figures discussed above, Embodiment 2 provides a high performance zoom optical system that can maintain excellent optical performance during the correction for preventing blurring of an image while providing a compact zoom optical system.

The zoom optical system with an image-blur prevention function of the present invention is formed of, in order from the object side, a first lens group having positive refractive power, a second lens group having negative refractive power, a third lens group having positive refractive power, and a fourth lens group having positive refractive power. Additionally, the third lens group is constructed to include, in order from the object side, an image-blur prevention lens element that has an aspheric surface at least on one side, a biconvex lens element, and a biconcave lens element joined to the biconvex lens element to form a lens component, and the correction for blurring of an image by movements of the zoom optical system, such as vibrations, is accomplished by moving the image-blur prevention lens element perpendicular to the optical axis. With this construction of the zoom optical system, efficient image-blur prevention can be achieved while maintaining a compact contstruction. Furthermore, by satisfying all of Conditions (1)–(4) above, reduction in the overall length and improvement in the optical performance throughout the entire zoom range can be achieved. Therefore, sufficient correction for vibration such as from shaking hands can be realized, and good optical performance can be achieved while making the construction more compact.

The present invention is not limited to the aforementioned embodiments, as it will be immediately apparent that various alternative implementations are possible. For instance, values such as the radius of curvature R of each of the lens components and lens elements, the shapes of the aspheric lens surfaces, the surface spacings D, the refractive index $N_d$, and Abbe number $v_d$ of the lens elements are not limited to those indicated in each of the aforementioned embodiments, as other values can be adopted. Also, for example, although in the embodiments described above, image-blur prevention is achieved by movement of lens element L8 of the third lens group G3 having aspheric surfaces on both sides, a lens element having an aspheric surface on only one surface may be used. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom optical system that includes a function of preventing blurring of an image comprising, arranged along an optical axis in order from the object side as follows:
    a first lens group having positive refractive power;
    a second lens group having negative refractive power;
    a third lens group having positive refractive power; and
    a fourth lens group having positive refractive power;
wherein
    said second lens group and said fourth lens group move along the optical axis when zooming the zoom optical system between the wide-angle end and the telephoto end;
    said fourth lens group moves along the optical axis during focusing of the zoom optical system;
    said third lens group includes, arranged along the optical axis in order from the object side, a lens element having positive refractive power that performs said function of preventing blurring of an image and that includes at least one aspheric surface, a biconvex lens element, and a biconcave lens element joined with said biconvex lens element to form a lens component;
    said lens element having positive refractive power performs said function of preventing blurring of an image by moving perpendicular to the optical axis; and
    the following conditions are satisfied:

$$0.36 < |f2/(fw \cdot ft)^{0.5}| < 0.45$$

$$4.3 < f3/fw < 7.0$$

$$2.0 < bfw/fw < 2.9$$

where
    f2 is the focal length of said second lens group,
    fw is the focal length of the entire zoom optical system at the wide-angle end,
    ft is the focal length of the entire zoom optical system at the telephoto end,
    f3 is the focal length of said third lens group, and
    bfw is the back focal length of the entire zoom optical system.

2. The zoom optical system of claim 1, wherein the following condition is satisfied:

$$0.4 < |(1-\beta tSL) \cdot \beta tr| < 1.0$$

where
    βtSL is the image magnification at the telephoto end of said lens element having positive refractive power that performs said function of preventing blurring of an image, and
    βtr is the image magnification at the telephoto end of the entire portion of the entire zoom optical system that is on the image side of said lens element having positive refractive power that performs said function of preventing blurring of an image.

* * * * *

UNITED STATES PATENT AND TRADEMARK OFFICE
CERTIFICATE OF CORRECTION

PATENT NO. : 7,212,350 B2  Page 1 of 1
APPLICATION NO. : 11/365841
DATED : May 1, 2007
INVENTOR(S) : Ori It is certified that error appears in the above-identified patent and that said Letters Patent is hereby corrected as shown below:

Column 7
Line 34, change "is suppressed . . . reduced." to -- are suppressed, and chromatic aberrations are reduced. --;

Column 8
Line 18, change "system." to -- system at the wide-angle end. --;

Column 9
Line 6, change "too great," to -- too small, the response of image-blur prevention becomes too slow, and the maximum displacement M of image-blur prevention increases, resulting in miniaturizing the entire construction becoming difficult. On the other hand, if the upper limit of Condition (4) is not satisfied, the sensitivity of image-blur prevention becomes too great, --; and Column 16
Line 36, change "system." to -- system at the wide-angle end. --

Signed and Sealed this

Tenth Day of July, 2007

JON W. DUDAS
*Director of the United States Patent and Trademark Office*